US010612826B2

(12) United States Patent
Hern et al.

(10) Patent No.: US 10,612,826 B2
(45) Date of Patent: Apr. 7, 2020

(54) SYSTEMS AND METHODS FOR ELECTRONIC EXPANSION VALVE CONTROL

(71) Applicant: Johnson Controls Technology Company, Plymouth, MI (US)

(72) Inventors: Shawn A. Hern, Park City, KS (US); Brian D. Rigg, Douglass, KS (US); Tom R. Tasker, Andover, KS (US); Elton D. Ray, Wichita, KS (US)

(73) Assignee: Johnson Controls Technology Company, Auburn Hills, MI (US)

(*) Notice: Subject to any disclaimer, the term of this patent is extended or adjusted under 35 U.S.C. 154(b) by 269 days.

(21) Appl. No.: 15/417,186

(22) Filed: Jan. 26, 2017

(65) Prior Publication Data

US 2018/0209703 A1 Jul. 26, 2018

(51) Int. Cl.
*F25B 49/02* (2006.01)
*G05D 23/00* (2006.01)
*G05D 23/19* (2006.01)
*F25B 13/00* (2006.01)

(52) U.S. Cl.
CPC .............. *F25B 49/02* (2013.01); *F25B 13/00* (2013.01); *F25B 2313/0312* (2013.01); *F25B 2313/0314* (2013.01); *F25B 2313/0315* (2013.01); *F25B 2500/19* (2013.01); *F25B 2600/01* (2013.01); *F25B 2600/0253* (2013.01); *F25B 2600/2513* (2013.01); *F25B 2700/1931* (2013.01); *F25B 2700/1933* (2013.01); *F25B 2700/2104* (2013.01); *F25B 2700/2106* (2013.01); *F25B 2700/21151* (2013.01); *F25B 2700/21152* (2013.01); *G05D 23/00* (2013.01); *G05D 23/1919* (2013.01); *Y02B 30/741* (2013.01)

(58) Field of Classification Search
CPC .......... F25B 49/02; F25B 13/00; G05D 23/00
See application file for complete search history.

(56) References Cited

U.S. PATENT DOCUMENTS

| | | | |
|---|---|---|---|
| 2,380,386 A * | 7/1945 | Crawford | B61D 27/0018 62/122 |
| 5,771,703 A | 6/1998 | Rajendran | |
| 5,867,998 A | 2/1999 | Guertin | |
| 7,290,402 B1 | 11/2007 | Bailey | |
| 8,151,583 B2 | 4/2012 | Douglas | |
| 9,151,526 B2 | 10/2015 | Qu et al. | |
| 9,261,300 B2 | 2/2016 | Golden et al. | |

(Continued)

*Primary Examiner* — Ljiljana V. Ciric
*Assistant Examiner* — Alexis K Cox
(74) *Attorney, Agent, or Firm* — Foley & Lardner LLP (57) ABSTRACT

An HVAC system includes, an electronic expansion valve (EEV), and a controller in communication with the EEV. The controller determines a minimum EEV setpoint position value based on a comparison of a superheat error value to a setpoint error threshold. The controller determines a maximum EEV setpoint position value based on a comparison of a second superheat error value to a second setpoint error threshold. The controller calculates an average setpoint value based on the maximum EEV setpoint position value and the minimum EEV setpoint position value. The controller configures the EEV to a position corresponding to the average setpoint value and operate the EEV for a predetermined amount of time. The controller operates the EEV according to a PID algorithm.

8 Claims, 6 Drawing Sheets

(56) References Cited

U.S. PATENT DOCUMENTS

| | | | |
|---|---|---|---|
| 2006/0042282 A1* | 3/2006 | Ludwig | F25B 41/04 62/222 |
| 2007/0089434 A1* | 4/2007 | Singh | F25B 49/02 62/129 |
| 2009/0090118 A1* | 4/2009 | Pham | F04B 39/06 62/228.5 |
| 2010/0198416 A1* | 8/2010 | Kasahara | F25B 13/00 700/282 |
| 2012/0041608 A1* | 2/2012 | Zugibe | G06F 17/5068 700/285 |

\* cited by examiner

SYSTEMS AND METHODS FOR ELECTRONIC EXPANSION VALVE CONTROL

BACKGROUND

The present disclosure generally relates to controlling an electronic expansion valve (EEV) in a heating, ventilating, and air-conditioning (HVAC) system. EEV devices are configured to regulate superheat temperature of refrigerant in an HVAC system. For example, if low superheat is observed in refrigerant fluid, a position of an EEV port may be configured to incrementally close. Conversely, if high superheat is observed in refrigerant fluid, the position of the EEV port may be configured to incrementally open.

Various algorithms may be used to achieve steady-state conditions corresponding to an optimal superheat temperature in an HVAC system. For example, many EEV controllers employ a form of closed loop feedback, such as a proportional, integral, and differential (PID) algorithm to maintain optimal superheat temperature. However, upon startup the HVAC system may require several minutes to proceed from a transient stage to a steady-state stage. During the transient stage, the HVAC system may be operating at suboptimal or inefficient conditions.

SUMMARY

One implementation of the present disclosure is a residential heating, ventilation, and air-conditioning (HVAC) system that includes, an electronic expansion valve (EEV), and an outdoor unit controller in communication with the compressor. The outdoor unit controller is configured to determine a minimum EEV setpoint position value based on a comparison of a superheat error value to a setpoint error threshold. The outdoor unit controller is further configured to determine a maximum EEV setpoint position value based on a comparison of a second superheat error value to a second setpoint error threshold. The outdoor unit controller is further configured to calculate an average setpoint value based on the maximum EEV setpoint position value and the minimum EEV setpoint position value. The outdoor unit controller is further configured to configure the EEV to a position corresponding to the average setpoint value and operate the EEV for a predetermined amount of time. The outdoor unit controller is further configured to operate the EEV according to a control feedback loop system.

In some embodiments, the outdoor unit controller is further configured to determine a position of the EEV corresponding to previous steady-state operation, and operate the EEV at the determined position. In some embodiments, the predetermined amount of time corresponds to a value of three minutes. In some embodiments, the control feedback loop system is a proportional-integral-derivative (PID) algorithm. In some embodiments, the superheat error value corresponds to a current superheat reading value minus a superheat setpoint value, and the setpoint error threshold is the superheat setpoint value plus 2° Fahrenheit.

In some embodiments, when the expansion valve has not operated for at least 3 minutes the system is configured to omit the determine the minimum EEV setpoint position value, determine the maximum EEV setpoint position value, calculate the average setpoint value, and configure the EEV.

In some embodiments, before the determine the minimum EEV setpoint position value, the system is further configured to receive a current valve position value and retrieve a previous valve position value from a memory; and when the current valve position value is less than the previous valve position value, the system is configured to omit the determine the minimum EEV setpoint position value, determine the maximum EEV setpoint position value, calculate the average setpoint value, and configure the EEV.

Another implementation of the present disclosure is a method for controlling a position of an EEV of an HVAC system in a startup sequence. The method includes determining a minimum EEV setpoint position value based on a comparison of a superheat error value to a setpoint error threshold value, determining a maximum EEV setpoint position value based on a comparison of a second superheat error value to a second setpoint error threshold value, calculating an average setpoint value based on the maximum EEV setpoint position value and the minimum EEV setpoint position value, configuring the EEV to a position corresponding to the average setpoint value and operating the EEV for a predetermined amount of time, and operating the EEV according to a proportional-integral-derivative (PID) algorithm.

In some embodiments, the method includes determining a position of the EEV corresponding to previous steady-state operation, and operating the EEV at the determined position. In some embodiments, the predetermined amount of time corresponds to a value of three minutes.

In some embodiments, when the expansion valve has not operated for at least 3 minutes, the determining the minimum EEV setpoint position value, the determining the maximum EEV setpoint position value, the calculating the average setpoint value, and the configuring the EEV steps are omitted.

In some embodiments, before the determining the minimum EEV setpoint position value step, the method further includes receiving a current valve position value and retrieving a previous valve position value from a memory; and when the current valve position value is less than the previous valve position value, the determining the minimum EEV setpoint position value, the determining the maximum EEV setpoint position value, the calculating the average setpoint value, and the configuring the EEV steps are omitted.

Another implementation of the present disclosure is an outdoor unit controller in a residential HVAC system and in communication with a thermostat and EEV. The outdoor unit controller is configured to determine a minimum EEV setpoint position value based on a comparison of a superheat error value to a setpoint error threshold. The outdoor unit controller is further configured to determine a maximum EEV setpoint position value based on a comparison of a second superheat error value to a second setpoint error threshold. The outdoor unit controller is further configured to calculate an average setpoint value based on the maximum EEV setpoint position value and the minimum EEV setpoint position value. The outdoor unit controller is further configured to configure the EEV to a position corresponding to the average setpoint value and operate the EEV for a predetermined amount of time. The outdoor unit controller is further configured to operate the EEV according to a control feedback loop system.

In some embodiments, the outdoor unit controller is further configured to determine a position of the EEV corresponding to previous steady-state operation, and operate the EEV at the determined position. In some embodiments, the predetermined amount of time corresponds to a value of three minutes. In some embodiments, the control feedback loop system is a proportional-integral-derivative (PID) algorithm. In some embodiments, the superheat error value corresponds to a current superheat reading value minus a superheat setpoint value, and the setpoint error threshold is the superheat setpoint value plus 2° Fahrenheit.

In some embodiments, when the EEV has not operated for at least 3 minutes the outdoor unit controller is configured to omit the determine the minimum EEV setpoint position value, determine the maximum EEV setpoint position value, calculate the average setpoint value, and configure the EEV.

In some embodiments, before the determine the minimum EEV setpoint position value, the outdoor unit controller is further configured to receive a current valve position value and retrieve a previous valve position value from a memory; and when the current valve position value is less than the previous valve position value, the outdoor unit controller is configured to omit the determine the minimum EEV setpoint position value, determine the maximum EEV setpoint position value, calculate the average setpoint value, and configure the EEV Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Some embodiments will become more fully understood from the following detailed description, taken in conjunction with the accompanying drawings, wherein like reference numerals refer to like elements, in which.

DETAILED DESCRIPTION

Overview of HVAC System

Figure 1:
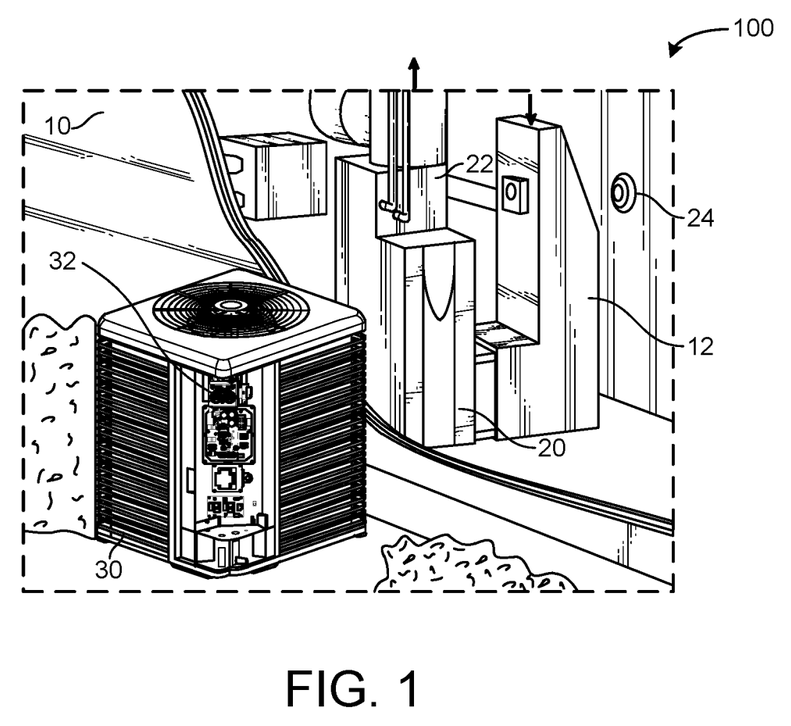
FIG. 1 is a schematic drawing of a building equipped with a residential heating and cooling system, according to an exemplary embodiment.

FIG. 1 illustrates a residential heating and cooling system 100. The residential heating and cooling system may provide heated and cooled air to a residential structure, as well as provide outside air for ventilation and provide improved indoor air quality (IAQ) through devices such as ultraviolet lights and air filters. Although described as a residential heating and cooling system, embodiments of the systems and methods described herein can be utilized in a cooling unit or a heating unit in a variety of applications include commercial HVAC units (e.g., roof top units). In general, a residence 10 includes refrigerant conduits that operatively couple an indoor unit 20 to an outdoor unit 30. Indoor unit 20 may be positioned in a utility space, an attic, a basement, and so forth. Outdoor unit 30 is situated adjacent to a side of residence 10 in some embodiments and is covered by a shroud or housing to protect the system components and to prevent leaves and other contaminants from entering the unit. Refrigerant conduits transfer refrigerant between indoor unit 20 and outdoor unit 30, typically transferring primarily liquid refrigerant in one direction and primarily vaporized refrigerant in an opposite direction.

When the system shown in FIG. 1 is operating as an air conditioner, a coil in outdoor unit 30 serves as a condenser for recondensing vaporized refrigerant flowing from indoor unit 20 to outdoor unit 30 via one of the refrigerant conduits. In these applications, a coil of the indoor unit, designated by the reference numeral 22, serves as an evaporator coil. Evaporator coil 22 receives liquid refrigerant (which may be expanded by an expansion device, not shown) and evaporates the refrigerant before returning it to outdoor unit 30.

Outdoor unit 30 draws in environmental air through its sides as indicated by the arrows directed to the sides of the unit, forces the air through the outer unit coil using a fan, and expels the air. When operating as an air conditioner, the air is heated by the condenser coil within the outdoor unit and exits the top of the unit at a temperature higher than it entered the sides. Air is blown over indoor coil 22 and is then circulated through residence 10 by means of ductwork 12, as indicated by the arrows entering and exiting ductwork 12. The overall system operates to maintain a desired temperature as set by thermostat 24. When the temperature sensed inside the residence is higher than the set point on the thermostat (with the addition of a relatively small tolerance), the air conditioner will become operative to refrigerate additional air for circulation through the residence. When the temperature reaches the set point (with the removal of a relatively small tolerance), the unit can stop the refrigeration cycle temporarily.

In one embodiment, the outdoor unit 30 is configured to control one or more expansion valves, including electronic expansion valves (EEV), to provide a more efficient operation of the expansion valve by reducing the variations in the position of the valves when determining the required set point position. Specifically, the outdoor unit 30 is configured to calculate an average setpoint value based on a maximum EEV setpoint position value and a minimum EEV setpoint position value. The outdoor unit is further configured to control the EEV to a position corresponding to the average setpoint value and operate the EEV for a predetermined amount of time at the average setpoint. This allows for the EEV to operate at a position close to an expected required position prior to controlling the EEV using a control loop, such as a PID.

When the unit in FIG. 1 operates as a heat pump, the roles of the coils are simply reversed. That is, the coil of outdoor unit 30 will serve as an evaporator to evaporate refrigerant and thereby cool air entering outdoor unit 30 as the air passes over the outdoor unit coil. Indoor coil 22 will receive a stream of air blown over it and will heat the air by condensing a refrigerant.

Thermostat 24 may be any controller and/or device that can be configured to generate control signals to cause indoor unit 20 and/or outdoor unit 30 to heat, cool, and/or control the humidity of residence 10. In this regard, thermostat 24 may be communicable coupled to indoor unit 20 and/or outdoor unit 30. In various embodiments, thermostat 24 is connected to indoor unit 20 and/or outdoor unit 30 via RS-485, RS-232, WI-FI, and/or any other network or communication method. In various embodiments, indoor unit 20 and outdoor unit 30 are daisy chained via RS-485 to thermostat 24. In further embodiments, indoor unit 20 and outdoor unit 30 are connected via an RS-485 star topology.

In addition to generating control signals for indoor unit 20 and outdoor unit 30 (e.g., indoor control signals and outdoor control signals), thermostat 24 can be configured to collect operating data from indoor unit 20 and/or outdoor unit 30. In various embodiments, the connected data is a superheat value, a subcool value, a suction pressure, a suction temperature, a discharge temperature, a discharge temperature, an outdoor ambient temperature value (OAT), compressor speed (i.e., RPM), outdoor electronic expansion valve step value, fault data, and/or any other measured, calculated, and/or generated data.

Figure 2:
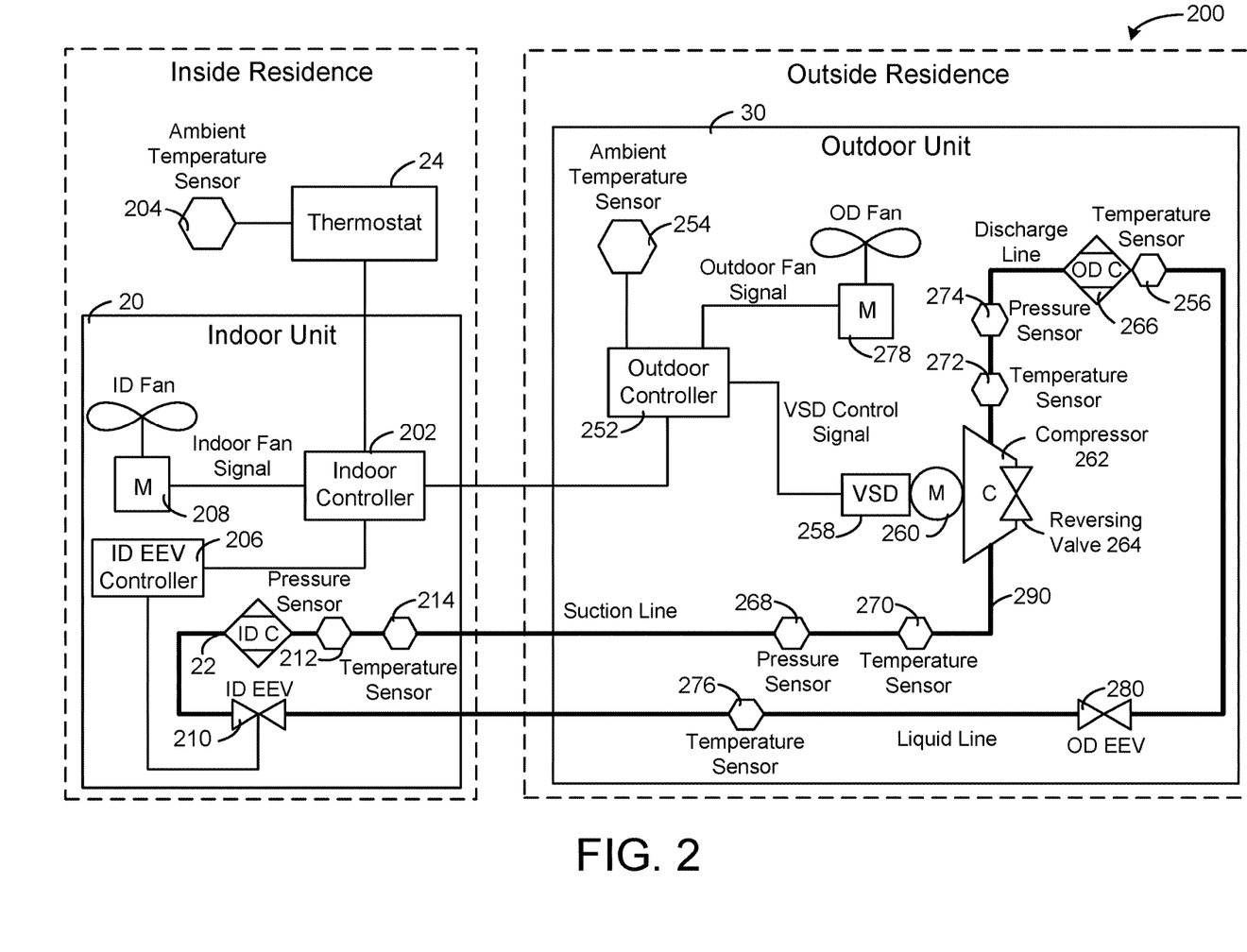
FIG. 2 is a schematic drawing of an indoor unit, an outdoor unit, an a refrigeration line of the system of FIG. 1, according to an exemplary embodiment.

Referring now to FIG. 2, an HVAC system 200 is shown according to an exemplary embodiment. Various components of system 200 are located inside residence 10 while other components are located outside residence 10 (FIG. 1). Outdoor unit 30, as described with reference to FIG. 1, is shown to be located outside residence 10 while indoor unit 20 and thermostat 24, as described with reference to FIG. 1, are shown to be located inside the residence 10.

Thermostat 24 can be configured to generate control signals for indoor unit 20 and/or outdoor unit 30. Thermostat 24 is shown to be connected to ambient temperature sensor 204 while outdoor controller 252 is shown to be connected to ambient temperature sensor 254. Ambient temperature sensor 204 and ambient temperature sensor 254 are any kind of temperature sensor (e.g., thermistor, thermocouple, etc.). Thermostat 24 may measure the temperature of residence 10 via ambient temperature sensor 204. Further, thermostat 24 can be configured to receive the temperature outside residence 10 via communication with outdoor controller 252. In various embodiments, thermostat 24 generates control signals for indoor unit 20 and outdoor unit 30 based on the indoor temperature (e.g., measured via ambient temperature sensor 204), the outdoor temperature (e.g., measured via ambient temperature sensor 254), and/or a temperature setpoint.

In various embodiments, thermostat 24 can cause indoor unit 20 and outdoor unit 30 to heat residence 10. In some embodiments, thermostat 24 can cause indoor unit 20 and outdoor unit 30 to cool residence 10.

Indoor unit 20 and outdoor unit 30 may be electrically connected as described with reference to FIG. 2. Further, indoor unit 20 and outdoor unit 30 may be coupled via conduits 290. Outdoor unit 30 can be configured to compress refrigerant inside conduits 290 to either heat or cool the building based on the operating mode of the indoor unit 20 and the outdoor unit 30 (e.g., heat pump operation or air conditioning operation). The refrigerant inside conduits 290 may be any fluid that absorbs and extracts heat. For example, the refrigerant may be hydro fluorocarbon (HFC) based R-410A, R-407C, and/or R-134a.

Outdoor unit 30 is shown to include outdoor controller 252, variable speed drive 258, motor 260 and compressor 262. Outdoor unit 30 can be configured to control compressor 262 and cause compressor 262 to compress the refrigerant inside conduits 290. In this regard, the compressor 262 may be driven by variable speed drive 258 and motor 260. For example, outdoor controller 252 can generate control signals for variable speed drive 258. Variable speed drive 258 (e.g., an inverter, a variable frequency drive, etc.) may be an AC-AC inverter, a DC-AC inverter, and/or any other type of inverter. Variable speed drive 258 can be configured to vary the torque and/or speed of motor 260 which in turn drives the speed and/or torque of compressor 262. Compressor 262 may be any suitable compressor such as a screw compressor, a reciprocating compressor, a rotary compressor, a swing link compressor, a scroll compressor, or a turbine compressor, etc.

In some embodiments, outdoor controller 252 can control reversing valve 264 to operate system 200 as a heat pump or an air conditioner. For example, outdoor controller 252 may cause reversing valve 264 to direct compressed refrigerant to the indoor coil 22 while in heat pump mode and to the outdoor coil 266 while in air conditioner mode. In this regard, indoor coil 22 and outdoor coil 266 can both act as condensers and evaporators depending on the operating mode (i.e., heat pump or air conditioner) of system 200.

Further, in various embodiments, outdoor controller 252 can be configured to control and/or receive data from outdoor electronic expansion valve 280. Outdoor electronic expansion valve 280 may be an expansion valve controlled by a stepper motor. In this regard, outdoor controller 252 can be configured to generate a step signal (e.g., a PWM signal) for the outdoor electronic expansion valve 280. Based on the step signal, outdoor electronic expansion valve 280 can be held fully open, fully closed, partial open, etc. In various embodiments, the outdoor controller 252 can be configured to generate step signal for the outdoor electronic expansion valve 280 based on a subcool and/or superheat value calculated from various temperatures and pressures measured in system 200.

Outdoor controller 252 can be configured to control and/or power outdoor fan 278. Outdoor fan 278 can be configured to blow air over outdoor coil 266. In this regard, outdoor controller 252 can control the amount of air blowing over the outdoor coil 266 by generating control signals to control the speed and/or torque of outdoor fan 278. In some embodiments, the control signals are pulse wave modulated signals (PWM), analog voltage signals (i.e., varying the amplitude of a DC or AC signal), and/or any other type of signal.

Outdoor unit 30 may include one or more temperature sensors and one or more pressure sensors. The temperature sensors and pressure sensors may be electrical connected (i.e., via wires, via wireless communication, etc.) to outdoor controller 252. In this regard, outdoor controller 252 can be configured to measure and store the temperatures and pressures of the refrigerant at various locations of conduits 290. The pressure sensors may be any kind of transducer that can be configured to sense the pressure of the refrigerant in conduits 290. Outdoor unit 30 is shown to include pressure sensor 268. Pressure sensor 268 may measure the pressure of the refrigerant in conduit 290 in the suction line (i.e., a predefined distance from the inlet of compressor 262. Further, outdoor unit 30 is shown to include pressure sensor 274. Pressure sensor 274 may be configured to measure the pressure of the refrigerant in conduits 290 on the discharge line (e.g., a predefined distance from the outlet of compressor 262).

The temperature sensors of outdoor unit 30 may include thermistors, thermocouples, and/or any other temperature sensing device. Outdoor unit 30 is shown to include temperature sensor 256, temperature sensor 270, temperature sensor 276, and temperature sensor 272. The temperature sensors (i.e., temperature sensor 256, temperature sensor 270, temperature sensor 276, and/or temperature sensor 272) can be configured to measure the temperature of the refrigerant at various locations inside conduits 290. Temperature sensor 256 can be configured to measure the temperature of the refrigerant inside, at the inlet to, and/or at the outlet of outdoor coil 266. Temperature sensor 270 can be configured to measure the temperature of the refrigerant inside the suction line (i.e., a predefined distance from the inlet of compressor 262. Temperature sensor 276 can be configured to measure the temperature of the liquid line (i.e., a predefined distance from the outlet of the outdoor coil 266). Further, temperature sensor 272 can be configured to measure the temperature of the discharge line (i.e., a predefined distance from the outlet of the compressor and/or a predefined distance from the inlet of the outdoor coil 266).

Still referring to FIG. 2, indoor unit 20 is shown to include indoor controller 202, indoor electronic expansion valve controller 206, indoor fan 208, indoor coil 22, indoor electronic expansion valve 210, pressure sensor 212, and temperature sensor 214. Indoor controller 202 can be configured to generate control signals for indoor electronic expansion valve controller 206. The signals may be setpoints (e.g., temperature setpoint, pressure setpoint, superheat setpoint, subcool setpoint, step value setpoint, etc.). In this regard, indoor electronic expansion valve controller 252 can be configured to generate control signals for indoor electronic expansion valve 210. In various embodiments, indoor electronic expansion valve 210 may be the same type of valve as outdoor electronic expansion valve 280. In this regard, indoor electronic expansion valve controller 252 can be configured to generate a step control signal (e.g., a PWM wave) for controlling the stepper motor of electronic expansion valve 210. In this regard, indoor electronic expansion valve controller 252 can be configured to fully open, fully close, or partially close electronic expansion valve based on the step signal.

Indoor controller 202 can be configured to control indoor fan 208. Indoor fan 208 can be configured to blow air over indoor coil 22. In this regard, indoor controller 202 can control the amount of air blowing over the indoor coil 22 by generating control signals to control the speed and/or torque of outdoor fan 278. In some embodiments, the control signals are pulse wave modulated signals (PWM), analog voltage signals (i.e., varying the amplitude of a DC or AC signal), and/or any other type of signal.

Indoor controller 202 may be electrically connected (e.g., wired connection, wireless connection, etc.) to pressure sensor 212 and/or temperature sensor 214. In this regard, indoor controller 202 can take pressure and/or temperature sensing measurements via pressure sensor 212 and/or temperature sensor 214. Pressure sensor 212 may be located on the suction line (i.e., a predefined distance from indoor coil 22) while temperature sensor 214 may be located on the suction line (i.e., a predefined distance from the outlet of indoor coil 22).

Electronic Expansion Valve Control

Figure 3:
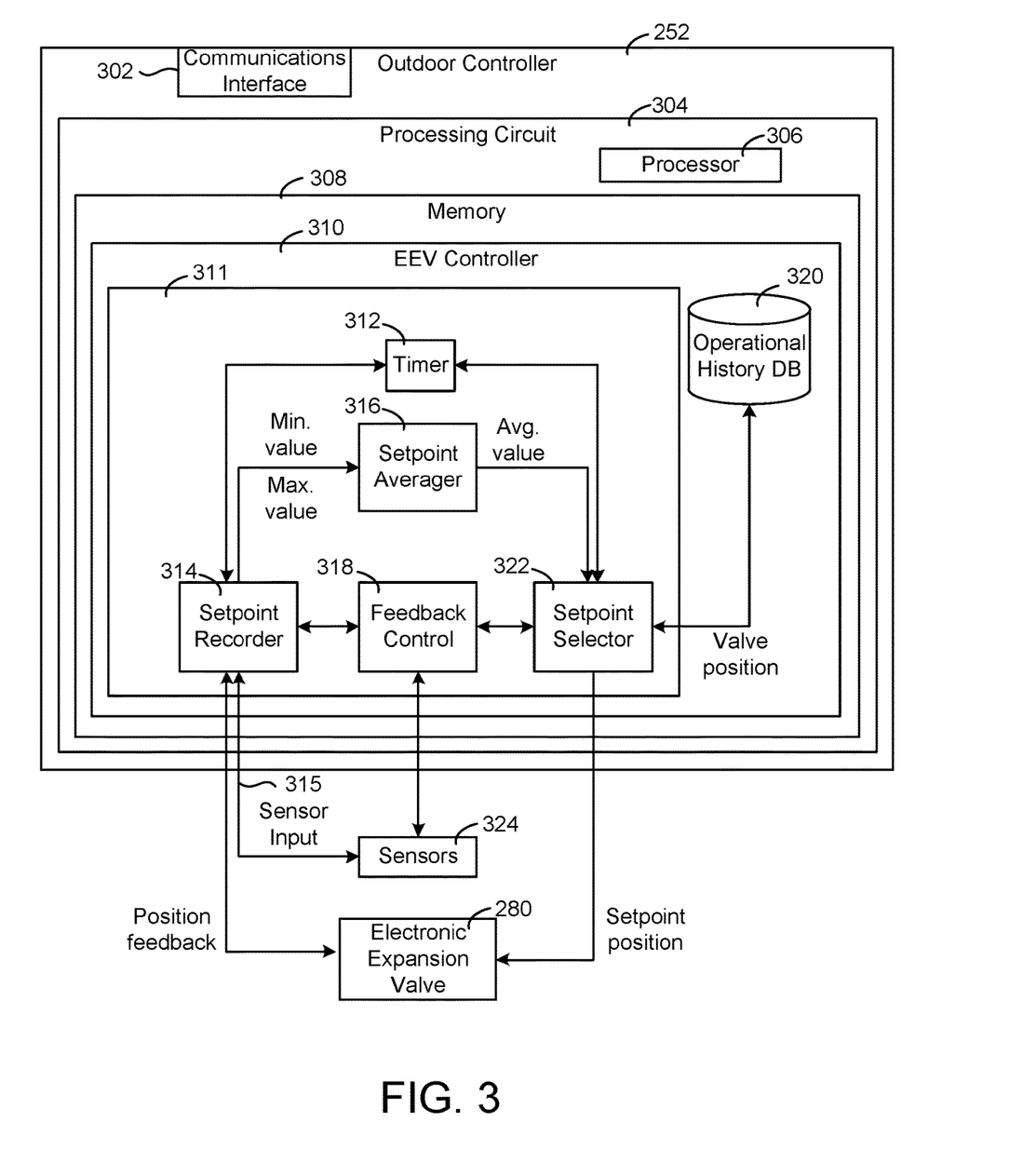
FIG. 3 is a block diagram of a controller of the outdoor unit of FIG. 2, according to an exemplary embodiment.

Referring now to FIG. 3, outdoor controller 252 is shown in further detail to illustrate implementation of electronic expansion valve control, according to an embodiment. Outdoor controller 252 can be configured to generate control signals for controlling and monitoring various components in the HVAC system as detailed above and provided below.

Outdoor controller 252 is shown to be communicably connected to sensors 324. In some embodiments, sensors 324 are generally configured to sense one or more properties of refrigerant in system 200, such as superheat temperature and pressure. In this regard, sensors 324 may include a temperature-sensitive device, such as a thermistor or any suitable temperature measuring device. In some embodiments, sensors 324 include pressure-sensitive devices, such as a pressure transducer or any suitable pressure measuring device.

In some embodiments, sensors 324 provide sensor input to setpoint recorder 314 and feedback control 318. Sensors 324 can be configured to provide sensor input through any suitable means, such as control signaling. In some embodiments, sensors 324 are configured to provide sensor input based on control signals received by feedback control 318 and setpoint recorder 314. For example, sensors may commence an operation to measure refrigerant temperature and system pressure at a frequency of once per second, based on command by setpoint recorder 314.

Outdoor controller 252 is shown to be communicably connected to electronic expansion valve (EEV) 280. In some embodiments, EEV 280 is generally configured to control the flow of refrigerant in HVAC system 200 in response to input data and/or predetermined algorithms. In some embodiments, EEV 280 is generally configured to adjust a position in response to commands received via one or more control devices. Control devices may include EEV controller 310 or any other suitable control device, such as an external device. In some embodiments, EEV 280 employs an integral stepper motor which operates to adjust the position of a valve port, which in turn enables the EEV 280 to selectively release refrigerant. Any suitably rated motor or mechanical device that achieves the object of the present disclosure may be used.

In FIG. 3, outdoor controller 252 is shown to include communications interface 302 and processing circuit 304. Communications interface 302 is generally configured to communicate with an internal or external device using control signals. In some embodiments, communications interface 302 can receive operating commands from thermostat 24 and distribute the operating commands to various components of outdoor controller (e.g., processing circuit 304, memory 308, components of memory 308, processor 306, etc.). In various embodiments, communications interface 302 can be configured to send and receive various calculated and/or measured system status variables to thermostat 24.

Processing circuit 304 is shown to include a processor 306 and memory 308. Processor 306 can be a general purpose or specific purpose processor, an application specific integrated circuit (ASIC), one or more field programmable gate arrays (FPGAs), a group of processing components, or other suitable processing components. Processor 306 may be configured to execute computer code and/or instructions stored in memory 308 or received from other computer readable media (e.g., CDROM, network storage, a remote server, etc.).

Memory 308 can include one or more devices (e.g., memory units, memory devices, storage devices, etc.) for storing data and/or computer code for completing and/or facilitating the various processes described in the present disclosure. Memory 308 can include random access memory (RAM), read-only memory (ROM), hard drive storage, temporary storage, non-volatile memory, flash memory, optical memory, or any other suitable memory for storing software objects and/or computer instructions. Memory 308 can include database components, object code components, script components, or any other type of information structure for supporting the various activities and information structures described in the present disclosure. Memory 308 can be communicably connected to processor 306 via processing circuit 304 and can include computer code for executing (e.g., by processor 306) one or more processes described herein.

Still referring to FIG. 3, memory 308 is shown to include EEV controller 310. EEV controller 310 can generally be configured to operate EEV 280 to achieve a desired subcool and/or superheat value in the HVAC system 200. In some embodiments, EEV controller 310 is configured to receive sensor input (e.g. temperature measurement or pressure measurement) from sensors 324 which are configured to monitor superheat conditions of refrigerant fluid in the system 200. In response to the sensor input, EEV controller 310 can determine if a position of EEV 280 should be adjusted to achieve desired superheat values.

EEV controller 310 is shown to include a control circuit 311 (including a timer 312, setpoint recorder 314, setpoint averager 316, and feedback control 318, a setpoint selector 322, and an operational history database 320, In some embodiments, timer 312, setpoint recorder 314, setpoint averager 316, feedback control 318, operational history database 320, and/or setpoint selector 322 may be located in memory 308 or in an external device, such as an equipment controller or building management system.

Setpoint recorder 314 is shown to receive sensor data or signals at a sensor input 315 from sensors 324. As described above, in some embodiment, sensors 324 are generally configured to sense evaporator superheat in the system 200. In some embodiments, setpoint recorder 314 is shown to receive valve position feedback from EEV 280. In some embodiments, EEV 280 employs an integral stepper motor to selectively adjust valve position. In this regard, a current valve position can correspond to a number of "steps" whereby the number of steps is generally commensurate with the extent the EEV valve is in an open position. For example, EEV 280 may employ a five hundred step stepper motor, and a valve position value of two hundred may correspond to a partially open (e.g. approximately 40% open) valve position of EEV 280. Similarly, a valve position value of zero may correspond to a fully closed EEV 280.

In some embodiments, position feedback from EEV 280 includes information or measurements pertaining to the position of EEV 280. For example, EEV 280 can be configured to provide position feedback to setpoint recorder 314 at predefined time intervals. In some embodiments, timer 312 measures time intervals and provides control signaling to setpoint recorder 314 according to a predefined time frequency. For example, setpoint recorder 314 can be configured to signal to EEV 280 to provide position feedback once per second. In some embodiments, EEV 280 is configured to transmit position feedback to setpoint recorder 314 at predetermined stages of operation, such as startup or shutdown.

Setpoint recorder 314 can be configured to determine a minimum setpoint position and a maximum setpoint position. In some embodiments, minimum setpoint position generally relates to an EEV 280 position associated with a minimum superheat temperature. Minimum superheat temperature can be determined based on sensor input received by sensors 324. In some embodiments, maximum setpoint position generally relates to an EEV 280 position associated with a maximum superheat temperature. Maximum superheat temperature can be determined based on sensor input received by sensors 324.

Setpoint recorder 314 can be configured to determine minimum setpoint position and maximum setpoint position using any suitable process. In some embodiments, setpoint recorder 314 determines minimum setpoint position and maximum setpoint position as a function of superheat measurements and superheat error.

For example, setpoint recorder 314 may obtain a current superheat reading value via sensor input from sensors 324. The current superheat reading value may be determined using a combination of measurement values and calculated values. In some embodiments, when setpoint recorder 314 receives a valid pressure reading via sensor input from sensors 324, a current superheat value is determined to be equal to measured suction temperature minus saturated suction temperature. In this regard, a superheat error value is equal to the current superheat reading value minus a superheat setpoint value. In some embodiments, setpoint recorder 314 may calculate the current superheat reading value using different algorithms in response to receiving an invalid pressure or temperature reading.

In some embodiments, when the EEV controller 310 initiates a startup sequence of EEV 280, setpoint recorder 314 monitors superheat temperature via sensor data or signals received from sensors 324 to obtain a current superheat reading value and a setpoint error value. When the setpoint error value exceeds a predetermined threshold (e.g. 2° Fahrenheit), the setpoint recorder 314 can record a valve position corresponding to the minimum position reached by the EEV 280. In some embodiments, the setpoint recorder 314 will also initiate timer 312. In some embodiments, due to inherent system delay, the recorded valve position may correspond to a valve position marginally greater than the instantaneous valve position. In this regard, setpoint recorder 314 may continue to monitor valve position of EEV 280 to determine the minimum position.

In some embodiments, the valve position of EEV 280 is reversed upon the setpoint error value exceeding the predetermined threshold. The setpoint recorder 314 can be configured to subsequently determine the maximum setpoint position value. For example, setpoint recorder 314 can continue to monitor superheat reading values via sensor data or signals received from sensors 324, and continue to monitor valve position of EEV 280. If the current superheat reading value passes back down through the setpoint such that the setpoint error value exceeds a predetermined threshold (e.g. −2° Fahrenheit), setpoint recorder 314 can record a valve position corresponding to the maximum position reached by EEV 280. In some embodiments, due to inherent system delay, the recorded valve position may correspond to a valve position marginally less than the instantaneous valve position. In this regard, setpoint recorder 314 may continue to monitor valve position of EEV 280 to determine the maximum position.

In some embodiments, the setpoint recorder 314 terminates timer 312 and calculates a full cycle time. With regard to the above exemplary embodiment, time measured by timer 312 represents the time required for one-half cycle of the EEV operation. Accordingly, a full cycle time can be calculated by multiplying the measured time by two.

Setpoint averager 316 is shown to receive the minimum setpoint position value and the maximum setpoint position value from setpoint recorder 314. In some embodiments, setpoint averager 316 then calculates an average setpoint position value based on an average of the minimum setpoint position value and maximum setpoint position value. More particularly, the setpoint averager 316 can calculate the average by adding the minimum setpoint position value and maximum setpoint position value, and dividing the result by two. For example, if the maximum setpoint position value is four hundred, and the minimum setpoint position is two hundred, then the setpoint averager 316 will calculate an average setpoint value as being three hundred. Upon determining the average setpoint position, setpoint averager 316 transmits the average setpoint position value to the setpoint selector 322.

Still referring to FIG. 3, EEV controller 310 is shown to include setpoint selector 322. Setpoint selector 322 is shown to receive average setpoint position value from setpoint averager 316. Setpoint selector 322 can generally be configured to instruct the EEV 280 to operate at a certain valve position for a particular time period. In some embodiments, setpoint selector 322 is generally configured to control a startup sequence of EEV 280. In some embodiments, startup sequence is triggered via control signaling received by communications interface 302. For example, startup may be triggered by thermostat 24. Startup generally involves operating the HVAC system for a transient period, whereby the system seeks to operate at a steady-state stage using various control algorithms. Steady-state stage generally corresponds to operation of the EEV 280 under optimal superheat conditions (e.g. temperature) of refrigerant in the HVAC system. Setpoint selector 322 can be configured to minimize the time necessary to complete the transient stage.

In some embodiments, setpoint selector 322 is configured to operate the EEV 280 at the average setpoint position for a predetermined amount of time. In some embodiments, the predetermined amount of time value represents a value corresponding to the measured one-half cycle time. In some embodiments, the predetermined amount of time value represents a preset value, such as three minutes.

In some embodiments, at the conclusion of a one-half cycle of EEV operation, the setpoint recorder 314 sets the maximum valve setpoint position as the previous average if the current superheat reading value is less than the setpoint. In some embodiments, at the conclusion of a one-half cycle of EEV operation, the setpoint recorder 314 sets the minimum valve setpoint position as the previous average if the current superheat reading value is greater than the setpoint.

In some embodiments, the setpoint recorder 314 indicates to setpoint averager 316 to set the average setpoint position value to be equal to the minimum valve setpoint position (as determined above) if the current superheat reading value is greater than the setpoint. In some embodiments, the setpoint recorder 314 indicates to setpoint averager 316 to set the average setpoint position value to be equal to the maximum valve setpoint position (as determined above) if the current superheat reading value is not greater than the setpoint.

In some embodiments, after the EEV 280 has operated at the average setpoint position for the predetermined amount of time, setpoint selector 322 commences a feedback control loop sequence or algorithm. Embodiments can be configured to use any suitable sequence or algorithm, such as open loop or closed loop. For example, FIG. 3 shows feedback control 318, which may be configured to employ a PID (proportional-integral-derivative) algorithm.

In some embodiments, the EEV controller 310 is configured to operate the feedback control loop sequence immediately upon startup. In this regard, the EEV control 310 may bypass measuring maximum setpoint position and minimum setpoint position, and may not calculate the average setpoint position. In some embodiments, EEV controller 310 will immediately operate feedback control loop sequence if the system 200 has not run for a predetermined amount of time (e.g. three minutes). In some embodiments, controller 310 will immediately operate a feedback control loop sequence if the average setpoint position is greater than a current valve position. In this regard, upon startup, the setpoint recorder 314 can be configured to first determine the current valve position upon startup, and subsequently determine minimum and maximum setpoint positions.

Still referring to FIG. 3, EEV controller 310 is shown to include operational history database 320. Operational history database 320 can be configured to store data for subsequent retrieval. In some embodiments, stored data corresponds to a valve position of EEV 280. For example, operational history database 320 can be configured to store a valve position corresponding to steady-state operation. In this regard, when a startup sequence is initiated, setpoint selector 322 can query operational history database 320 to retrieve a valve position corresponding to a previous steady-state operation. In some embodiments, setpoint selector 322 will control the EEV 280 to operate at the retrieved valve position for a predetermined time prior to measuring maximum setpoint position and minimum setpoint position. For example, the setpoint selector 322 may control the EEV 280 to operate at the retrieved valve position for a period of 3 minutes prior to commencing measuring maximum setpoint position and minimum setpoint position.

Figure 4:
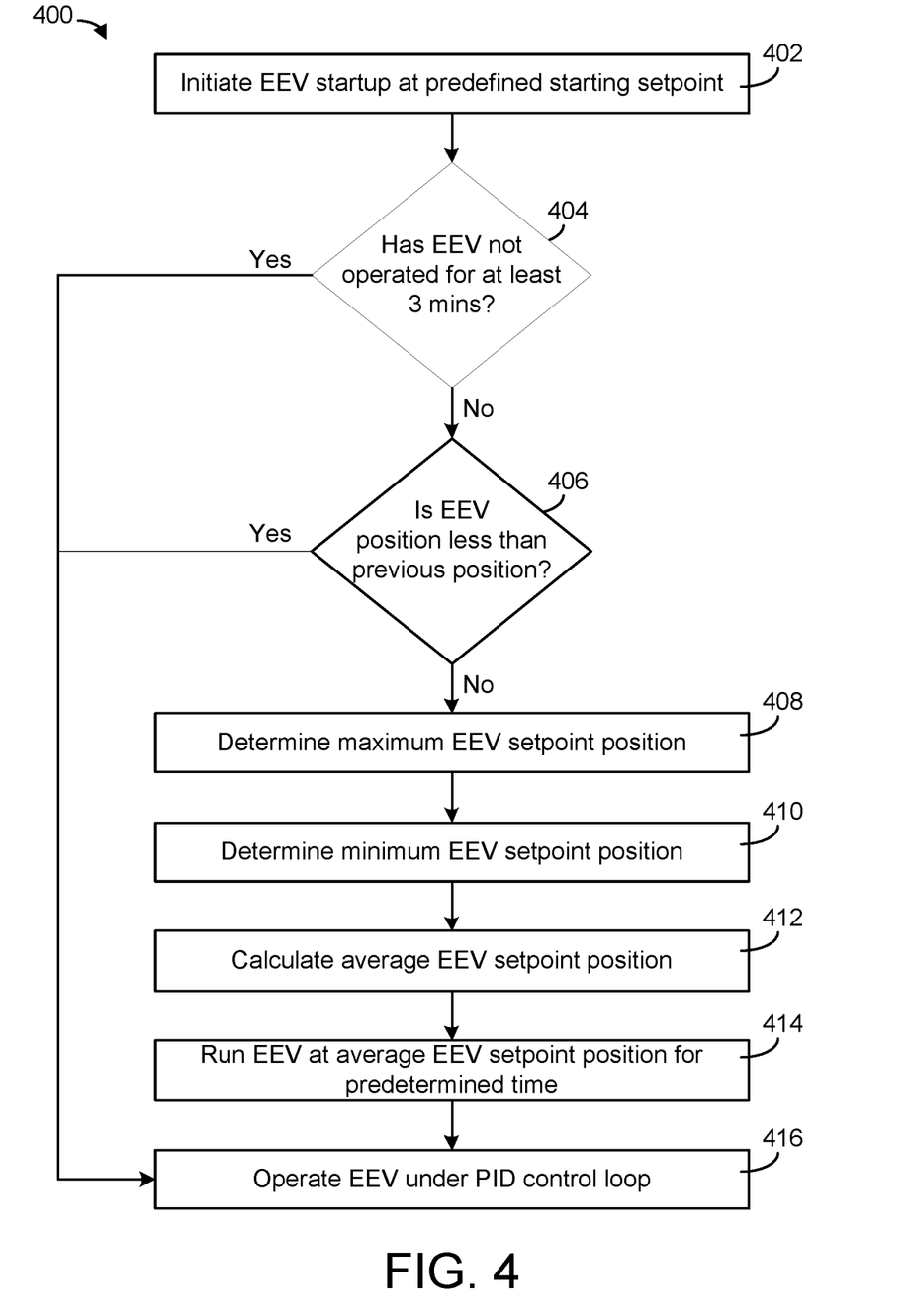
FIG. 4 is a flow chart of a process for controlling an electronic expansion valve, according to an exemplary embodiment.

Referring now to FIG. 4, a process 400 for controlling an EEV at startup is shown, according to an exemplary embodiment. In some embodiments, the process 400 is implemented by an outdoor controller of a residential HVAC system.

At step 402 an outdoor controller receives a control signal instructing the outdoor controller to commence a startup operation of the EEV. Startup generally involves operating the HVAC system for a transient period, whereby the system seeks to operate at a steady-state stage using various control algorithms. Steady-state stage generally corresponds to operation of the EEV under optimal superheat conditions (e.g. temperature) of refrigerant in the HVAC system.

In some embodiments, when a startup sequence is initiated, the outdoor controller configures a position of the EEV to match to a position corresponding to previous steady-state position. For example, during a previous operation sequence, the outdoor controller may store a steady-state valve position value in a database for subsequent retrieval during startup. In some embodiments, the startup sequence is initiated when the outdoor controller receives an indication via control to initiate the startup sequence. The control signal may be received via a communications interface communicably connected to the outdoor controller.

At step 404, the outdoor controller determines whether the EEV has not operated for a preset time period. Step 404 shows a time period of three minutes, but embodiments may use any suitable time period. As illustrated in step 404, if the EEV has not operated for at least three minutes, the outdoor controller skips to step 416. Conversely, if the EEV has operated within the past three minutes, the process continues to step 406.

At step 406, the outdoor controller determines whether a position of the EEV is less than a previous position. As illustrated in step 406, if a position of the EEV is less than the previous position, the outdoor controller skips to step 416. Conversely, if a position of the EEV is not less than the previous position, the process continues to step 408.

At step 408, the outdoor controller determines a minimum EEV setpoint position. In some embodiments, minimum setpoint position generally relates to an EEV position associated with a minimum superheat temperature. In some embodiments, when the outdoor controller initiates a startup sequence of EEV, superheat temperature can be monitored via sensors configured to a current superheat reading value. When the setpoint error value exceeds a predetermined threshold (e.g. 2° Fahrenheit), the setpoint recorder can record a valve position corresponding to the minimum position reached by the EEV. In some embodiments, due to inherent system delay, the superheat temperature and/or recorded valve position may correspond to a valve position marginally greater than the instantaneous valve position. In some embodiments, the valve position of EEV will reverse upon the setpoint error value exceeding the predetermined threshold.

At step 410, the outdoor controller determines a maximum EEV setpoint position. The setpoint recorder can be configured to subsequently determine the maximum setpoint position value upon completion of step 408. For example, outdoor controller can continue to monitor superheat reading values, and continue to monitor valve position of EEV. If the current superheat reading value passes back down through the setpoint such that the setpoint error value exceeds the predetermined threshold (e.g. −2° Fahrenheit), setpoint recorder can record a valve position corresponding to the maximum position reached by EEV.

At step 412, the outdoor controller calculates an average setpoint position value based on an average of the minimum setpoint position value and maximum setpoint position value. More particularly, the outdoor controller can calculate the average by adding the minimum setpoint position value and maximum setpoint position value, and dividing the result by two. For example, if the maximum setpoint position value is four hundred, and the minimum setpoint position is two hundred, then the outdoor controller will calculate an average setpoint value as being three hundred. Upon determining the average setpoint position, outdoor controller transmits the average setpoint position value to the setpoint selector.

At step 414, the outdoor controller is configured to run the EEV at the average valve position for a preset time period. In some embodiments, the preset time period represents a value corresponding to the measured one-half cycle time. In some embodiments, the predetermined amount of time value represents a preset value, such as three minutes.

At step 416, the outdoor controller operates the EEV under a PID control loop. In some embodiments, after the EEV has operated at the average setpoint position for the predetermined amount of time, the outdoor controller commences a feedback control loop sequence or algorithm. Embodiments can be configured to use any suitable sequence or algorithm, such as open loop or closed loop. For example, the outdoor controller may be configured to employ a PID (proportional-integral-derivative) algorithm.

Figure 5A:
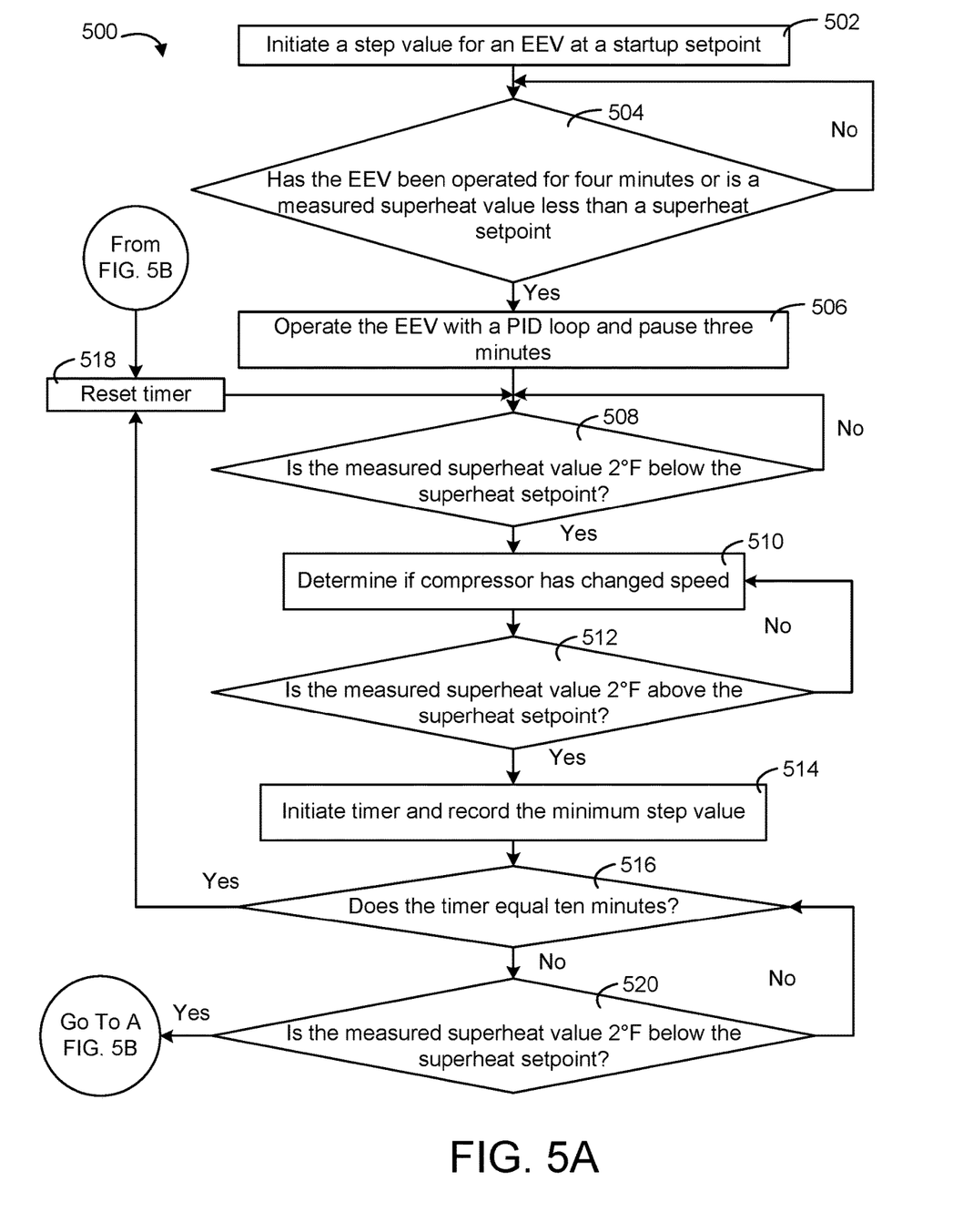
FIGS. 5A-5B are a flow chart illustrating a process for controlling an electronic expansion valve, according to an exemplary embodiment.
Figure 5B:
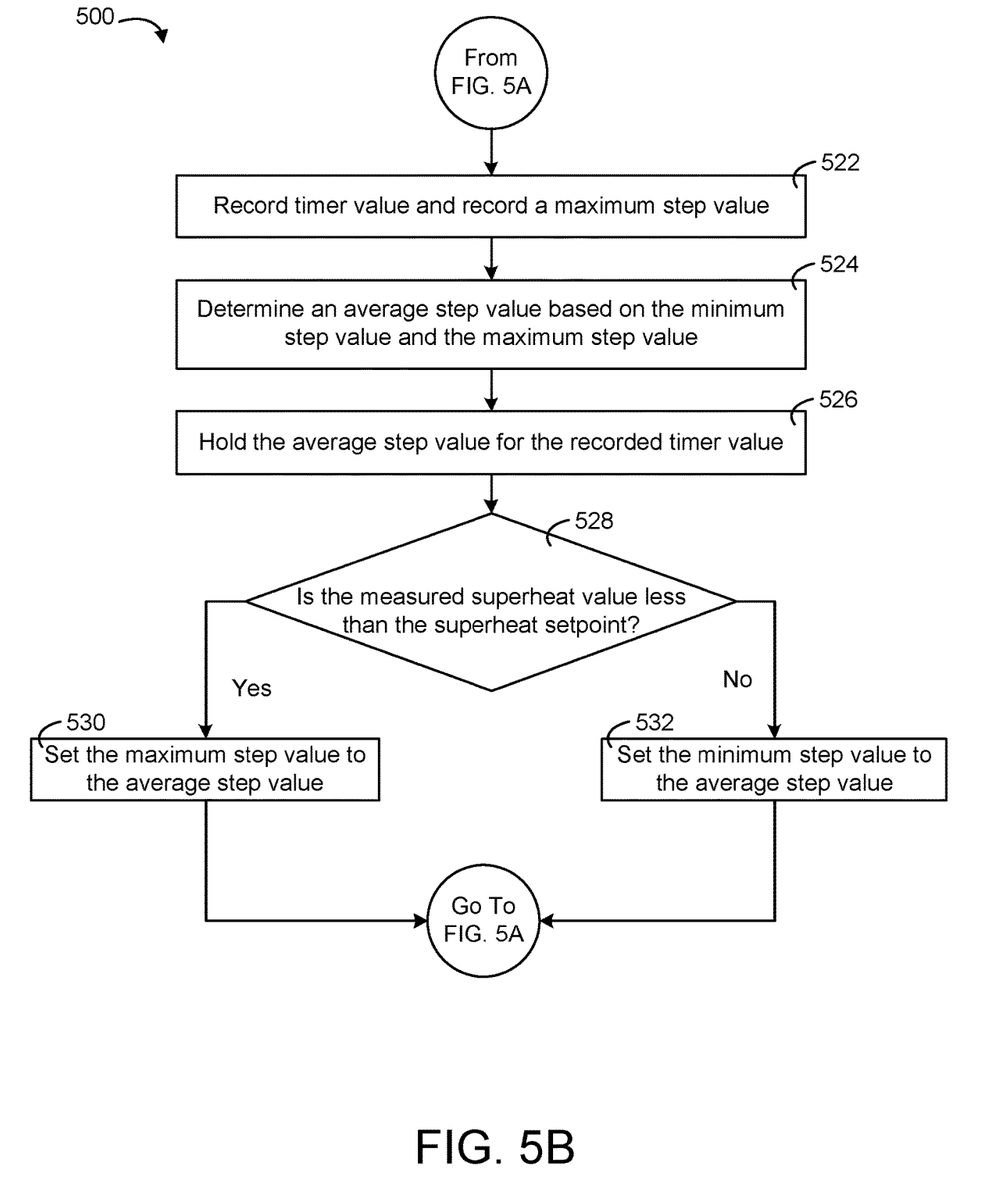

Referring now to FIGS. 5A-5B, a process 500 for operating electronic expansion valve 280 is shown, according to an exemplary embodiment. In this regard, outdoor controller 252, processing circuit 304, EEV controller 310 and/or the various components of processing circuit 304 (e.g., timer 312, setpoint average 316, setpoint recorder 314, feedback control 318, setpoint selector 322, etc.) can be configured to perform process 500.

In step 502, EEV controller 310 is configured select a predetermined step value for electronic expansion valve 280. In some embodiments, the step value is a step value for electronic expansion valve 280 which correlates to a measured ambient temperature (e.g., an ambient temperature measured by ambient temperature sensor 254). In this regard, whenever a steady state condition is reached, EEV controller 310 can be configured to record (e.g., save) the step value and the corresponding ambient temperature. In some embodiments, the predetermined step value is stored in and/or retrieved from operation history DB 320 by EEV controller 310. In some embodiments, step 502 is performed in response to a heating and/or cooling call and/or signal being received by outdoor controller 252 from thermostat 24 and/or indoor controller 202.

In step 504, EEV controller 310 determines if EEV controller 310 has operated electronic expansion valve 280 for four minutes or a measured superheat value is less than a superheat setpoint. In this regard, a timer (e.g., timer 312) may be used by EEV controller 310 to determine how long EEV controller 310 has been operating electronic expansion valve 280 (e.g., how much time has passed since step 502).

Further, EEV controller 310 may include a superheat setpoint. EEV controller 310 may control electronic expansion valve 280 to a superheat setpoint, a target superheat value. In some embodiments, the target is a predefined constant value. In various embodiments, the target is based on a heating and/or cooling command received from thermostat 24. Further, EEV controller 310 can be configured to determine a measured superheat value by communicating with various temperature and pressure sensors (e.g., pressure sensor 274, pressure sensor 272, etc.).

In step 506, EEV controller 310 can be configured to cause feedback control 318 to operate electronic expansion valve 280 via a feedback control process (e.g., a PID loop). In some embodiments, the input to the feedback loop is the superheat setpoint while the actual superheat value is the measured superheat value measured by EEV controller 310 via various temperature sensors and pressure sensors. In this regard, feedback control 318 may cause electronic expansion valve 280 to cause the measured superheat to approach the superheat setpoint. In step 506, EEV controller 310 may pause for a predefined amount of time (e.g., three minutes) while feedback control 318 controls electronic expansion valve 280.

In step 508, if the measured superheat value is 2° F. below the superheat setpoint, as determined by EEV controller 310, process 500 continues to step 510. If the condition is not met, EEV controller 310 may loop step 508. In some embodiments, if the measured superheat value is greater than 2° F. above the superheat setpoint, EEV controller 310 causes process 500 to continue to step 510. In step 510, EEV controller 310 is configured to determine if a compressor speed of compressor 262 has changed. In some embodiments, if the compressor speed has changed and/or changed by a predefined amount as compared to an initial compressor speed when the heating and/or cool call was received from thermostat 24 in step 502, EEV controller 310 can be configured to exit process 500, return to step 504, return to step 506, return to step 508, etc. This may ensure that the measured superheat value has not changed due to a change in compressor speed.

In step 512, EEV controller 310 is configured to determine if the measured superheat is 2° F. above the superheat setpoint and/or 2° F. or more above the superheat setpoint. In this regard, steps 508 and 512 may indicate that the measured superheat value is rising and has previously been at a minimum superheat value. If the condition of step 512 is true, EEV controller 310 can be configured to proceed to step 514. If the condition of step 512 is not true, EEV controller 310 can be configured to loop step 512 and/or return to step 510.

In step 514, EEV controller 310 can cause timer 312 to initiate a timer (e.g., start the timer at a predefined amount such as zero). Further, at step 514, the minimum step value of electronic expansion valve 280 may be recorded. In this regard, the step value recorded as the minimum step value may be the step value that corresponds with the lowest superheat value between step 508 and step 512. In this regard, EEV controller 310 can be configured to log all step values for each superheat value measured and be configured to select the minimum step value between step 508 and 512.

In step 516, if the timer started in step 514 started in step 514 is less than a predefined amount (e.g., ten minutes), EEV controller 310 can be configured to proceed to step 520. If EEV controller 310 determines that the time is equal to and/or greater than ten minutes, EEV controller 310 can be configured to proceed to step 518. In step 518, EEV controller 310 can cause timer 312 to reset the timer initiated at step 514 (e.g., set to zero) and process 500 to proceed to step 508.

In step 520, if the measured superheat value is 2° F. below the superheat setpoint and/or if the measured superheat value is greater than 2° F. below the superheat setpoint, EEV controller 310 can cause process 500 to proceed to step 522. If the condition of step 520 is not met, as determined by EEV controller 310, EEV controller 310 can be configured to loop step 520.

At step 522, EEV controller 310 can be configured to record the time value of the timer started in step 514. Further, the maximum step value can be recorded by EEV controller 310. In this regard, the maximum step value may correspond to a maximum measured superheat value. The maximum measured superheat value may be the highest superheat value measured between step 512 and step 520. In this regard, EEV controller 310 may record all of the step values corresponding to measured values. Measuring the maximum superheat step value between steps 512 and 520 may ensure that the maximum superheat step value is an absolute maximum instead of a relative maximum.

In step 524, EEV controller 310 can be configured to determine an average setpoint value based on the maximum step value recorded in step 522 and the minimum step value recorded in step 514. In some embodiments, EEV controller 310 performs an average of the maximum step value and the minimum step value. Further EEV controller 310 can be configured to command electronic expansion valve 324 to the averaged step value for the amount of time recorded in step 522. In step 528, EEV controller 310 can be configured to determine if the measured superheat value is less than the superheat setpoint. In this regard, EEV controller 310 can be configured to determine if the current average setpoint can be used as the minimum step value and/or the maximums step value in a subsequent iteration of process 500.

If in step 528, EEV controller 310 determines that the measured superheat value is less than the superheat setpoint, EEV controller 310 can be configured to cause process 500 to proceed to step 530. In step 528, if EEV controller 310 determines that the measured superheat value is greater than the measured superheat value, EEV controller can cause process 500 to proceed to step 532. In step 530, the maximum step value may be set to the average step value determined in step 524. In step 532, the minimum step value may be set to the average step value. In process 500, both step 530 and step 532 lead to step 514.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system comprising:
an electronic expansion valve configured to control a flow of refrigerant through a refrigerant line; and
an outdoor unit controller in communication with the electronic expansion valve, and configured to:
determine a first electronic expansion valve position value by recording a valve position value of the electronic expansion valve when a superheat of the refrigerant in the refrigerant line is determined to be at a minimum superheat value;
determine a second electronic expansion valve position value by recording the electronic expansion valve position value when the superheat of the refrigerant in the refrigerant line is determined to be at a maximum superheat value;
calculate an average electronic expansion valve position value based on the first electronic expansion valve position value and the second electronic expansion valve position value; and
control the electronic expansion valve to a position corresponding to the average electronic expansion valve position value for a predetermined amount of time.

2. The system of claim 1, wherein the outdoor unit controller is further configured to:
retrieve a position of the electronic expansion valve corresponding to previous steady-state operation from a memory device; and
operate the electronic expansion valve at the retrieved position.

3. The system of claim 1, wherein the outdoor unit controller is configured to control the electronic expansion valve according to a control loop feedback system, wherein the control loop feedback system is a proportional-integral-derivative algorithm.

4. The system of claim 1, wherein the outdoor unit controller is configured to control the electronic expansion valve with a feedback control algorithm in response to a determination that the electronic expansion valve has been operated for at least a predefined amount of time at a predefined setting after being turned on.

5. The system of claim 4, wherein the outdoor unit controller is configured to receive a current superheat value;
wherein the outdoor unit controller is configured to operate the electronic expansion valve with a feedback control algorithm in response to a determination that the current superheat value is less than a superheat setpoint.

6. The system of claim 1, wherein the first electronic expansion valve position value is one of a plurality of electronic expansion valve position values;
wherein the second electronic expansion valve position value is a second one of the plurality of electronic expansion valve position values.

7. The system of claim 1, wherein the outdoor unit controller is configured to determine the first electronic expansion valve position value by:
determining whether a first superheat value of a plurality of superheat values is a predefined amount less than a superheat setpoint;
determining whether a second superheat value of the plurality of superheat values is the predefined amount greater than the superheat setpoint after the first superheat value is the predefined amount less than the superheat setpoint; and
recording one of the plurality superheat values as the minimum superheat value in response to a determination that the first superheat value is the predefined amount less than the superheat setpoint and a determination that the second superheat value is the predefined amount greater than the superheat setpoint after the first superheat value is the predefined amount less than the superheat setpoint.

8. The system of claim 1, wherein the outdoor unit controller is configured to determine the second electronic expansion valve position value by:
determining whether a first superheat value of a plurality of superheat values is a predefined amount greater than a superheat setpoint;
determining whether a second superheat value of the plurality of superheat values is the predefined amount less than the superheat setpoint after the first superheat value is the predefined amount greater than the superheat setpoint; and
recording one of the plurality superheat values as the maximum superheat value in response to a determination that the first superheat value is the predefined amount greater than the superheat setpoint and a determination that the second superheat value is the predefined amount less than the superheat setpoint after the first superheat value is the predefined amount greater than the superheat setpoint.

* * * * *